J. D. BRUNER.
Cooking Stove.

No. 22,933. Patented Feb. 15, 1859.

WITNESSES
J. T. Everitt
John Hollingshead

INVENTOR
James D Bruner

UNITED STATES PATENT OFFICE.

JAMES D. BRUNER, OF ALTON, ILLINOIS.

STOVE.

Specification of Letters Patent No. 22,933, dated February 15, 1859.

*To all whom it may concern:*

Be it known that I, JAMES D. BRUNER, of the city of Alton, in the State of Illinois, have invented certain new and useful Improvements in Cook-Stoves; and I do hereby declare that the following is a full, clear, and exact description thereof, reference being had to the accompanying drawings and to the letters and marks thereon.

In cooking meats and baking bread in stoves it has always been found difficult to preserve the savory qualities of either and to have them possessed of the fine flavor they have when roasted in the tin oven before an open fire, or when baked in the usual brick oven. The loss of the savory quality and the deficiency of flavor I attribute to the absence of atmospheric air during the process of cooking—the meats and bread being surrounded during cooking or baking by the gases eliminated from them, or generated by matter from them coming in contact with the heated plates of the stove, commingled with only a small quantity of atmospheric air instead of being exposed to fresh supplies of it.

Now my invention has for its object the exposure of the meat or bread being cooked or baked to atmospheric air; and it consists in so arranging and connecting with the oven and the fire-box of the stove, cells or chambers through which the air may pass on its way to the oven and be heated, come in contact with the meat or bread and then pass out of the oven; and incidental to the main feature of my invention and for the better carrying of it out, my invention further consists in making the air cells or chambers detachable in combination with a detachable grate surface, so that in case of injury to any one of the cells or any part of the grate surface the injured portion may be readily removed and be replaced by a sound or new piece or part.

Figure 1:
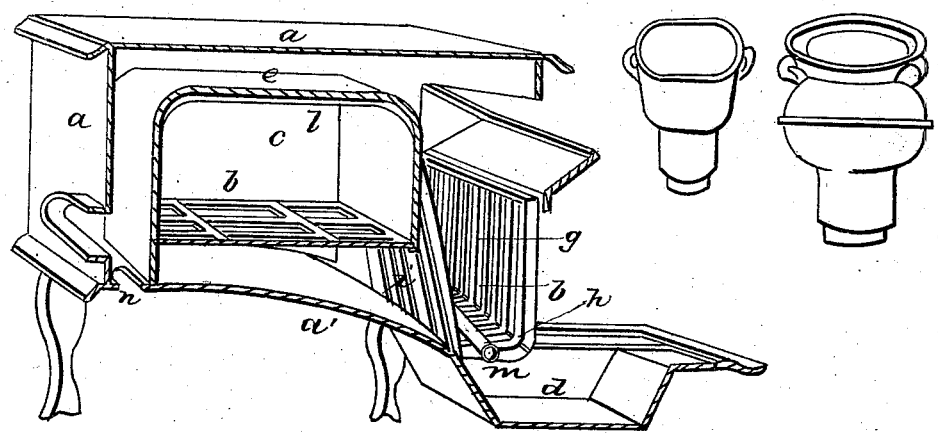
Figure 2:
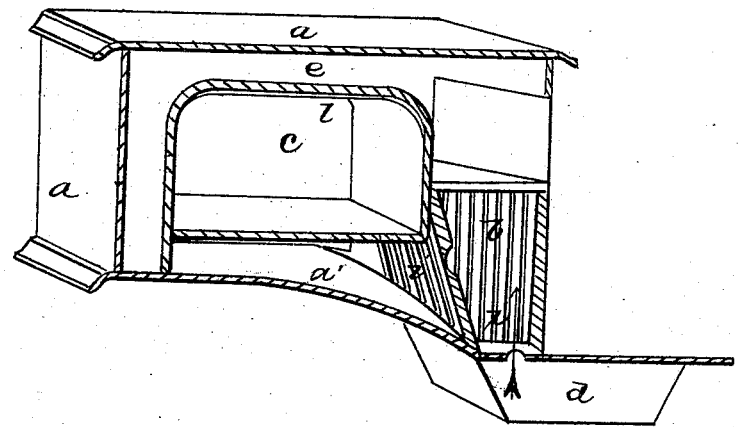

Of the drawings forming part of this specification Figure 1 is a central longitudinal section and Fig. 2 a side view with the plates of one side removed.

In both of these figures (*a*) indicates the exterior plates or shell of the stove, (*b*) the fire-box or furnace, (*c*) the oven, (*d*) the ash pit or pan, (*e*) the shell plate forming the arch and ends of the oven, (*f*) the grating bottom of the oven, which is detachable, (*g*) the front part of the grate, (*h*) the bottom part of the grate, (*i*) the fluted or corrugated plates which form the sides and ends of the fire-box and which with the side plates of the stove form end air chambers to the fire-box, and the front part or plate to the air chamber which is in open communication with the oven.

In this stove it will be noticed that the track of the heat and products of combustion is over the top of the oven down its back plate and out at the low outlet or passage marked (*k*). A plate (*l*) lies in the upper part of the oven a short distance below the arch of the oven which intercepts the heat from the arch plate. This plate (*l*) is curved downward at its end rests upon a slight ridge or projection from the front and rear oven plates, and plate (*l*) is slightly less in width than the oven so as to allow the air to circulate between its edges and the side plates or doors of the oven and between it and the arch plate of the oven. The fluted or corrugated plates (*i*) form the sides and back of the fire-box. They are so arranged with and connected to the grate surface that they as well as the grates may readily be taken out. The back plate (*i*) is the key plate which is first to be removed and the last to be put back. It fits into grooves at the back ends of the side plates and thus serves to keep the side plates in position. The front ends of the side plates fit into the space between the outer bars of the front part of the grate and the side plate of the stove. The horizontal part of the grate is affixed at one end to the one side plate (*i*) and at the other end to the side plate of the stove. It will thus be perceived that there is a mutual relation and connection between the air cells or chambers and the grates.

First taking out the backcell-plate (*i*) allows the removal of one of the end plates, then of the other with the displacing of the central or pivot bar of the grate (*m*), and then the removal of the two parts of grate bars. Reversing the order of handling the different parts named enables anyone to entirely replace all the parts making up the fire-box. Each and every part of the fire-box being easily and readily removed allows the replacing of any one or all the parts whenever it may be required.

The passage of the air into and through the air cells is indicated by red arrows in Fig. 2. It will be seen that the air comes in at the bottom of the plates, becomes heated, passes into the oven around and over the plate (*l*) and out either through holes in the door or end plate of the oven or through the space between the edges of the door and the stove plates. For this purpose I contemplate leaving more space than is usual between the edges of the door and the stove plates, though full provision for the circulation of the air and its passing out may be made by holes in the door or elsewhere.

As soot and other matter may collect at the point of discharge of the smoke and upon the bottom plates provision is made for clearing out the track by an opening in the back lower plate at (*n*).

This stove is more especially designed for burning bituminous coal and is, therefore, so constructed as to have a large flue or space between the fuel and the exit hole which allows of the more perfect consumption of the products of combustion, and hence greater economy in the use of fuel.

A plate of tin may be placed above the stove plate ($a'$) as a deflector of the heat toward the central part of the oven.

What I claim as new and desire to secure by Letters Patent is,

1. Connecting and arranging with an oven which has no bottom, and between which and the passages of the products of combustion there is no communication, the fire-box of the stove air chambers or cells as and for the purposes herein set forth.

2. Combining with a detachable grate surface the detachable air cells or chambers as herein described.

JAMES D. BRUNER.

Witnesses:
T. T. EVERETT,
JOHN S. HOLLINGSHEAD.